United States Patent
DiFrancesco et al.

(10) Patent No.: US 10,830,080 B2
(45) Date of Patent: Nov. 10, 2020

(54) HALO SEAL SEPARATE SCALLOP SUPPORT

(71) Applicant: United Technologies Corporation, Farmington, CT (US)

(72) Inventors: Michael L. DiFrancesco, Waterbury, CT (US); Conway Chuong, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 103 days.

(21) Appl. No.: 16/147,213

(22) Filed: Sep. 28, 2018

(65) Prior Publication Data

US 2020/0102846 A1 Apr. 2, 2020

(51) Int. Cl.
| F01D 11/02 | (2006.01) |
| F16J 15/44 | (2006.01) |
| F02C 7/28 | (2006.01) |

(52) U.S. Cl.
CPC .............. F01D 11/02 (2013.01); F02C 7/28 (2013.01); F16J 15/441 (2013.01); F05D 2220/32 (2013.01); F05D 2240/55 (2013.01)

(58) Field of Classification Search
CPC . F01D 11/02; F01D 11/025; F02C 7/28; F16J 15/441; F16J 15/442; F05D 2220/32; F05D 2220/321; F05D 2220/3212–13; F05D 2220/15–19; F05D 2240/55
USPC .......................................................... 277/409
See application file for complete search history.

(56) References Cited

U.S. PATENT DOCUMENTS

| 3,333,855 | A | * | 8/1967 | Andresen | ................. | F16J 15/38 |
| | | | | | | 277/581 |
| 6,364,316 | B1 | * | 4/2002 | Arora | ................... | F16J 15/3288 |
| | | | | | | 277/355 |
| 2010/0196164 | A1 | * | 8/2010 | Liotta | .................. | F01D 11/005 |
| | | | | | | 416/220 R |
| 2015/0322816 | A1 | * | 11/2015 | Schmitz | .................... | F01D 1/04 |
| | | | | | | 60/796 |
| 2016/0069269 | A1 | * | 3/2016 | Hyland | ..................... | F16J 15/44 |
| | | | | | | 415/1 |
| 2016/0130963 | A1 | * | 5/2016 | Wilson | .................. | F01D 11/001 |
| | | | | | | 60/805 |

FOREIGN PATENT DOCUMENTS

| EP | 3029361 | 6/2016 |
| EP | 3290647 | 3/2018 |
| EP | 3524780 | 8/2019 |
| WO | 2014143284 | 9/2014 |
| WO | 2014143322 | 9/2014 |

OTHER PUBLICATIONS

Figure (Year: 2015).*
European Patent Office, European Search Report dated Dec. 5, 2019 in Application No. 19188716.5.

* cited by examiner

*Primary Examiner* — Nathan Cumar
(74) *Attorney, Agent, or Firm* — Snell & Wilmer, L.L.P.

(57) ABSTRACT

A seal arrangement may comprise a seal comprising an outer ring, a shoe, and an arm extending between the shoe and the outer ring, wherein the shoe moves relative to the outer ring via the arm, a seal ring adjacent the seal, and a support plate disposed between the seal and the seal ring, wherein the support plate moves together with the shoe in a radial direction relative to the seal ring.

20 Claims, 7 Drawing Sheets

HALO SEAL SEPARATE SCALLOP SUPPORT

GOVERNMENT LICENSE RIGHTS

This invention was made with Government support awarded by the United States. The Government has certain rights in this invention.

FIELD

This disclosure relates generally to gas turbine engines, and more particularly to seal assemblies for turbine engine shafts.

BACKGROUND

Gas turbine engines typically include a fan delivering air into a compressor and through a bypass duct. The air is compressed in the compressor and delivered downstream into a combustion section where it is mixed with fuel and ignited. Products of this combustion pass downstream over turbine rotors, driving the turbine rotors to rotate. The turbine rotors in turn rotate the compressors and fan.

The fan and compressor are typically driven by the turbine rotors via shafts. Seals may be provided around the shafts.

SUMMARY

A seal arrangement is disclosed, comprising a seal comprising an outer ring, a shoe, and an arm extending between the shoe and the outer ring, wherein the shoe moves relative to the outer ring via the arm, a seal ring adjacent the seal, and a support plate disposed between the seal and the seal ring, wherein the support plate is configured to move together with the shoe in a radial direction relative to the seal ring.

In various embodiments, the seal, the seal ring, and the support plate are coaxial.

In various embodiments, the outer ring is in contact with the seal ring, the arm is spaced apart from the seal ring, and the shoe is spaced apart from the seal ring.

In various embodiments, the seal arrangement further comprises a fastener coupled between the shoe and the support plate, the fastener configured to prevent the support plate from moving relative to the shoe.

In various embodiments, the seal arrangement further comprises a pin coupled between the shoe and the support plate, the pin configured to prevent the support plate from moving relative to the shoe.

In various embodiments, the shoe is coupled to the support plate via at least one of a weld, a solder, or a braze.

In various embodiments, the seal comprises an annular geometry, the seal ring comprises an annular geometry, and the support plate comprises an annular geometry.

In various embodiments, the seal arrangement further comprises a carrier ring, wherein the seal, the seal ring, and the support plate are disposed within the carrier ring.

In various embodiments, the seal arrangement further comprises a spacer, at least one secondary seal, and a secondary seal cover, wherein at least a portion of the at least one secondary seal is located axially between the spacer and the secondary seal cover, and the spacer, the at least one secondary seal, and the secondary seal cover are located opposite the seal from the seal ring.

In various embodiments, the support plate comprises a coefficient of friction which is less than that of the seal.

In various embodiments, the seal comprises a non-contact seal.

A method for assembling a seal arrangement is disclosed, comprising attaching a support plate to a shoe of a seal, the seal comprises an outer ring, the shoe, and an arm extending between the shoe and the outer ring, wherein the shoe moves relative to the outer ring via the arm, and placing the seal and the attached support plate into a carrier ring, a distal surface of the outer ring in contact with the carrier ring in response to the seal being placed into the carrier ring.

In various embodiments, the method further comprises placing a seal ring into the carrier ring.

In various embodiments, the seal ring is placed axially adjacent to the seal.

In various embodiments, the method further comprises placing the outer ring and the support plate in contact with the seal ring.

In various embodiments, the support plate slides against the seal ring in response to the shoe moving relative to the outer ring.

A seal arrangement is disclosed, comprising a seal comprising an outer ring, a shoe, and an arm extending between the shoe and the outer ring, wherein the shoe moves relative to the outer ring via the arm, a seal ring adjacent the seal, and a support plate disposed between the seal and the seal ring, wherein the support plate moves with the shoe relative to the seal ring.

In various embodiments, a surface of the support plate is flush with the outer ring.

In various embodiments, the surface of the support plate is in contact with the seal ring.

In various embodiments, the support plate extends radially outwards from the shoe.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

As used herein, "snap" refers to the process of placement of a first cylindrical component into a second cylindrical component, such that the second cylindrical component circumferentially surrounds the first component, wherein the outer diameter (OD) of the first component is greater than or equal to the inner diameter (ID) of the second component. In various embodiments, the first component may be pressed into the second component, thereby reducing the OD of the first component to tightly fit into the second component. In various embodiments, the OD of the first component may be decreased by decreasing the temperature of the first component before placing the first component into the second component. In various embodiments, the ID of the second component may be increased by increasing the temperature of the second component before placing the first component into the second component.

A seal arrangement, as provided herein, may include a support plate coupled to a shoe of a seal (sometimes referred to as a HALO seal) and disposed between the shoe and a seal ring. The support plate may move with the shoe, the shoe and the support plate moving together in a radial direction with respect to the seal ring in response to pressure of a fluid acting on the seal. The support plate may effectively increase the surface area of the shoe which is in contact with the seal ring, thereby preventing the shoe from rocking with respect to the seal ring. The support plate may enable a net weight reduction of the shoe and increase the natural frequency of the shoe (i.e., excitation frequency), thereby increasing the margin of safety between the seal natural frequency and the rotational frequency of an adjacent shaft, thereby avoiding frequencies that may induce violent vibration of the shoe. The support plate may be replaceable, thereby acting as a sacrificial part. Manufacturing the support plate separate from the seal may allow additional manufacturing capability for the seal arms. Increased contact area between the shoe and the seal ring may reduce contact pressure to reduce wear rate from the rubbing between the support plate and the seal ring. The support plate may allow for greater range of travel of the shoe.

Figure 1:
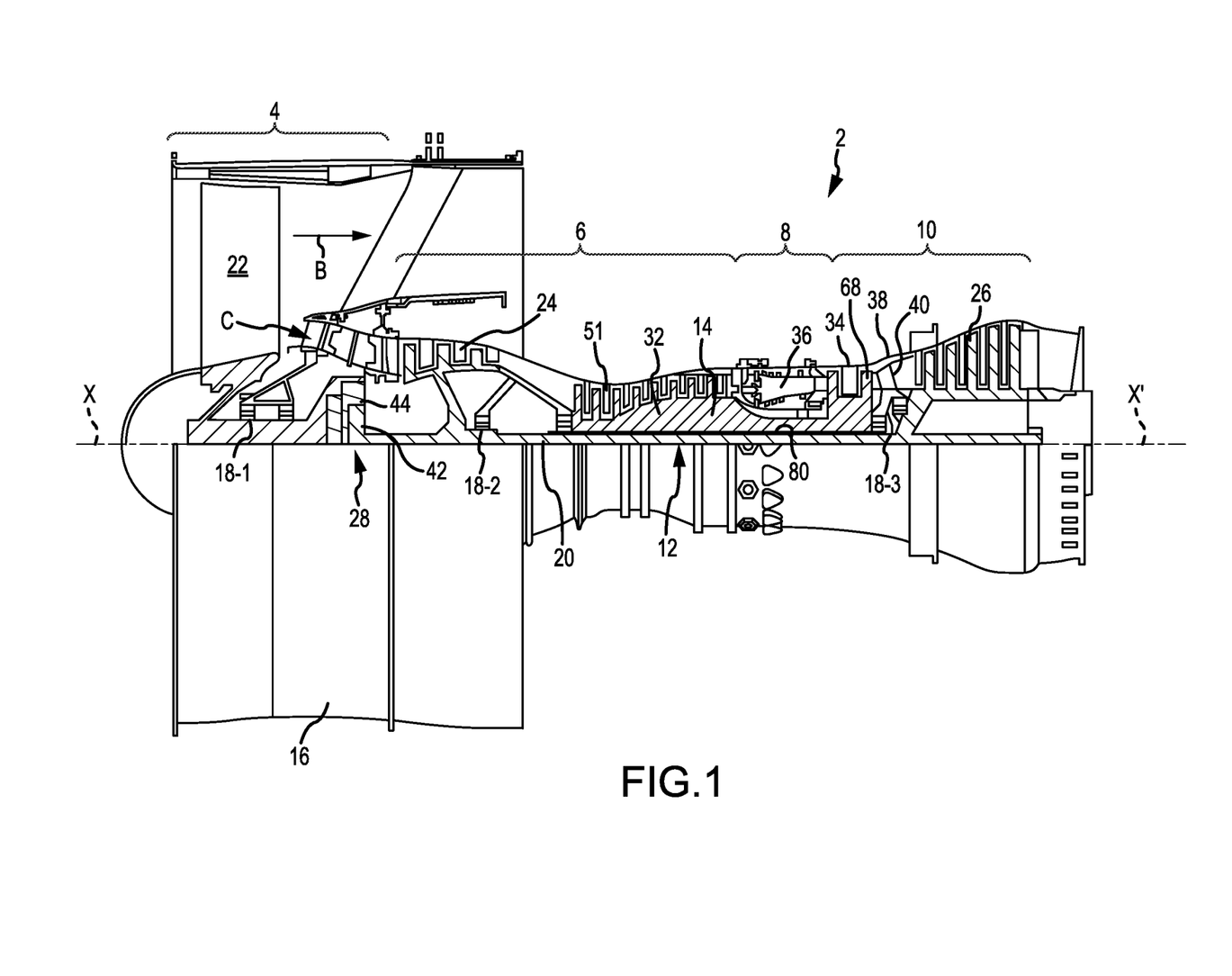
FIG. 1 illustrates a side cutaway view of a turbine engine, in accordance with various embodiments.

With reference to FIG. 1, an exemplary gas turbine engine 2 is provided, in accordance with various embodiments. Gas turbine engine 2 is a two-spool turbofan that generally incorporates a fan section 4, a compressor section 6, a combustor section 8 and a turbine section 10. Vanes 51 may be disposed throughout the gas turbine engine 2. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 4:
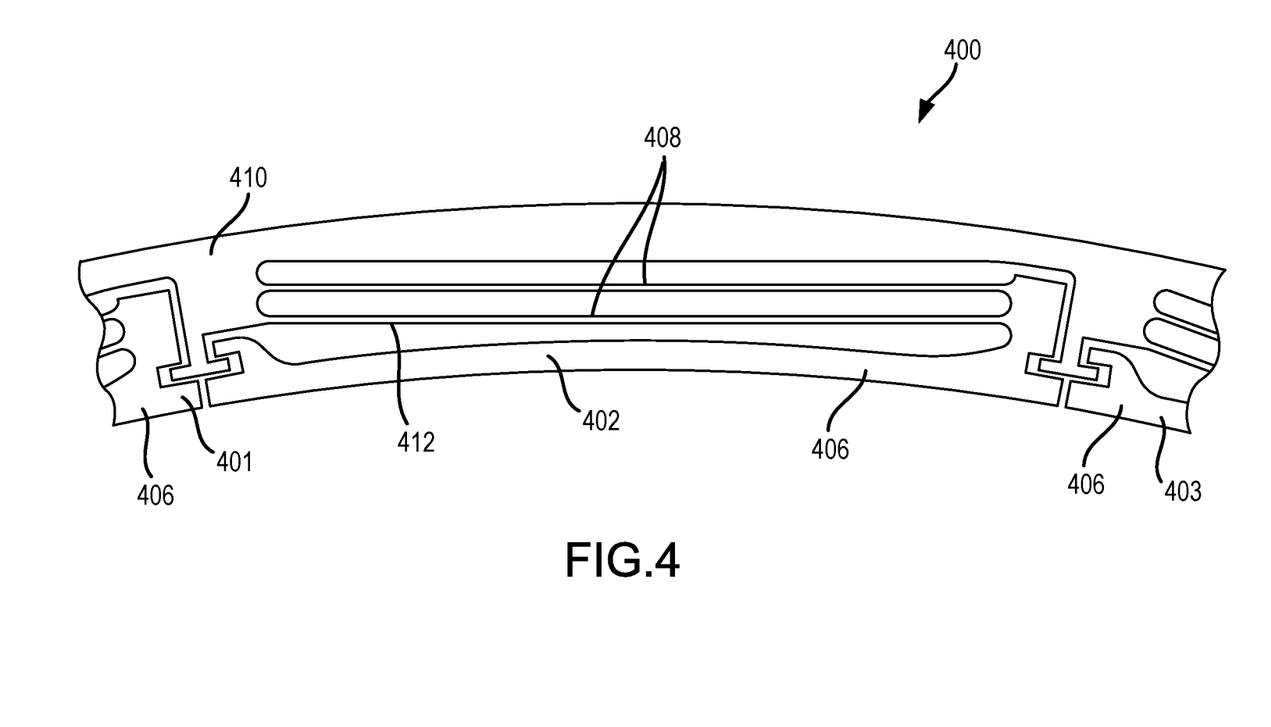
FIG. 4 illustrates an exemplary non-contact seal, in accordance with various embodiments.

A non-contact seal may be associated with the turbine section, the compressor section, or the fan section as illustrated in FIG. 1. FIG. 4 shows one example of a non-contact seal 400. The non-contact seal 400 as shown has shoes 406 and an outer ring 410. The outer ring 410 and the shoes 406 are generally formed from a single piece of metal, and may be cut as shown at 412 such that the combined non-contact seal 400 is formed into segments. As shown in FIG. 4, there are portions of three adjacent segments 401, 402, 403, which come together to form the overall non-contact seal 400. Shoes 406 may be coupled to outer ring 410 via arms 408. As shown, the cuts 412 may provide a gap that allows arms 408 to provide a spring force. Shoes 406 may move (e.g., radially) relative to outer ring 410 via arms 408. In various embodiments, non-contact seal 400 may be similar to seal 214 of FIG. 2A.

Figure 2A:
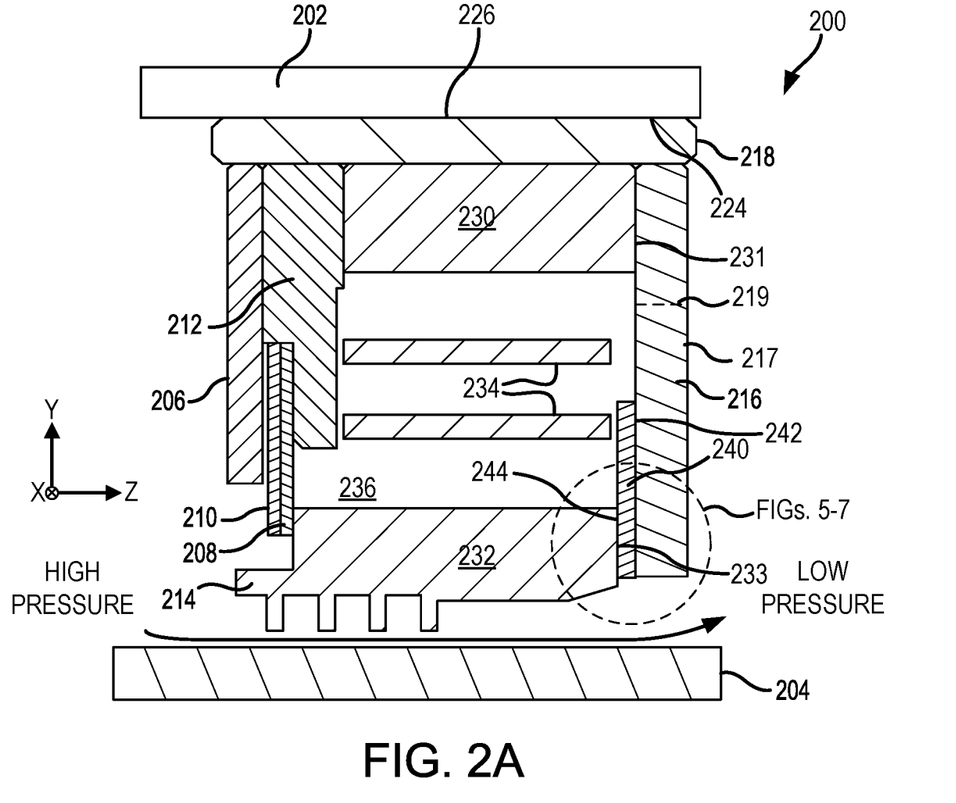
FIG. 2A illustrates a cross-section view of a seal arrangement installed within a static structure and over a shaft in a first position, in accordance with various embodiments.

With reference to FIG. 2A, a cross-section view of seal arrangement 200 in the installed position is illustrated, in accordance with various embodiments. Seal arrangement 200 may include seal 214, spacer 212, at least one secondary seal (i.e., first secondary seal 208 and/or second secondary seal 210), secondary seal cover 206, seal ring 216, and carrier ring 218. In various embodiments, static structure 202 may circumferentially surround seal arrangement 200. In various embodiments, seal arrangement 200 may be snapped into static structure 202. In various embodiments, secondary seal cover 206 may be snapped into carrier ring 218. In various embodiments, seal ring 216 may be snapped into carrier ring 218. In various embodiments, spacer 212 may be snapped into carrier ring 218. In various embodiments, seal 214 may be snapped into carrier ring 218. In various embodiments, seal ring 216 may be snapped into carrier ring 218. Seal arrangement 200 may circumferentially surround shaft 204. In various embodiments, seal 214 may comprise a non-contact seal. In this regard, seal 214 may be configured to not physically contact shaft 204. Stated differently, seal 214 may be configured to maintain a gap between shaft 204 and shoe 232.

Figure 3:
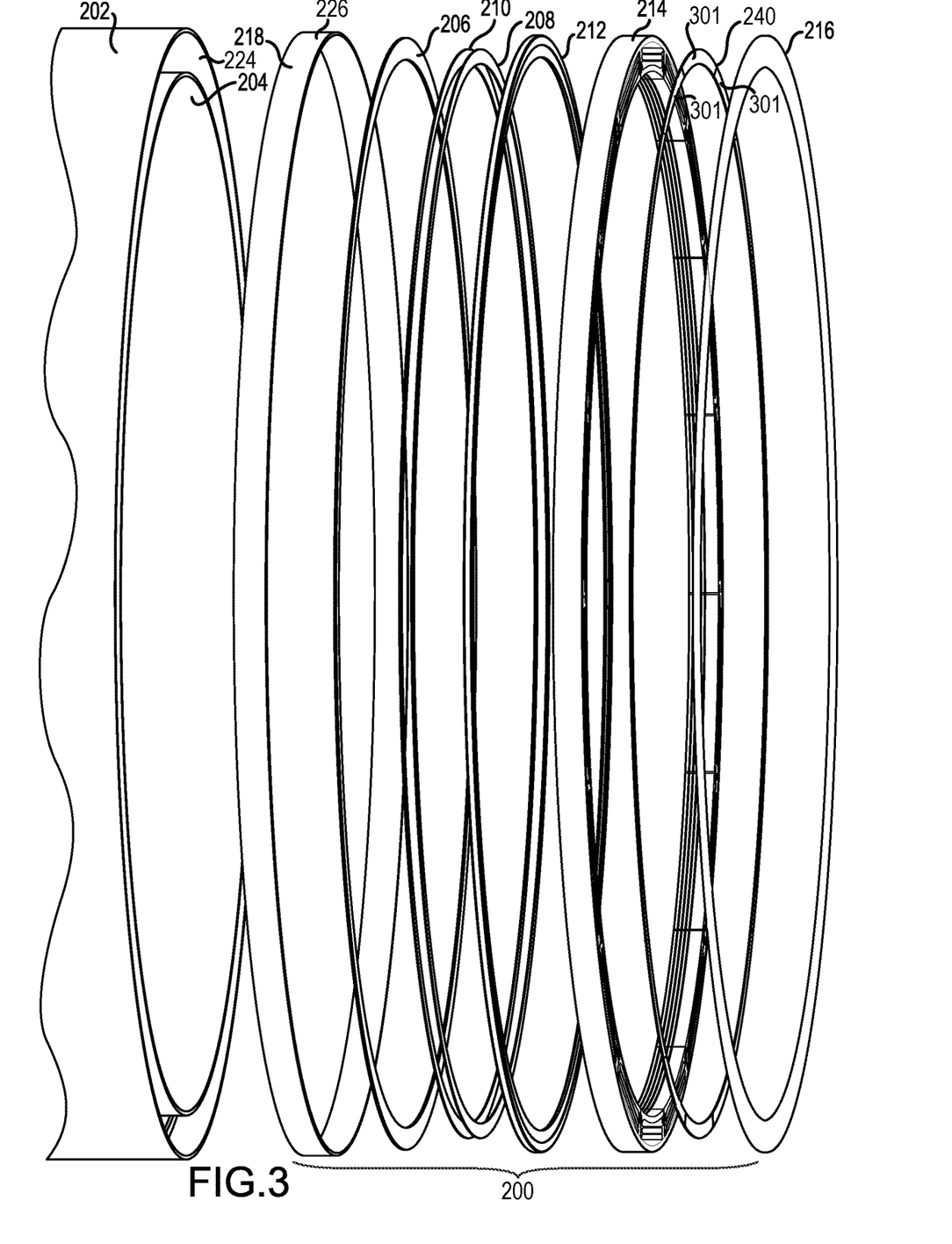
FIG. 3 illustrates an exploded perspective view of the seal arrangement of FIG. 2A, in accordance with various embodiments.

With combined reference to FIG. 2A and FIG. 3, carrier ring 218 may comprise a distal surface 226. Static structure 202 may comprise a proximal surface 224. Distal surface 226 may be in contact proximal surface 224. In various embodiments, carrier ring 218 may be snapped into static structure 202. In various embodiments, carrier ring 218 may be threaded into static structure 202.

As illustrated in FIG. 3, seal 214, spacer 212, first secondary seal 208, second secondary seal 210, secondary seal cover 206, seal ring 216, carrier ring 218, and/or support plate 240 may comprise an annular geometry. Seal 214, spacer 212, first secondary seal 208, second secondary seal 210, secondary seal cover 206, seal ring 216, carrier ring 218, and/or support plate 240 may be rings.

With combined reference to FIG. 3 and FIG. 4, support plate 240 may be a segmented ring with each support plate segment 301 coupled to a different shoe 406. Stated differently, support plate 240 may comprise a plurality of separate arcuate pieces (i.e., support plate segments 301) that collectively form support plate 240. In this regard, each support plate segment 301 may move freely and independently from each other with the associated shoe 406 to which the support plate segment 301 is attached.

With combined reference to FIG. 1 and FIG. 2A, shaft 204 may be mounted for rotation about engine central longitudinal axis X-X'. In various embodiments, shaft 204 may comprise low speed spool 12. In various embodiments, shaft 204 may comprise high speed spool 14.

Figure 2B:
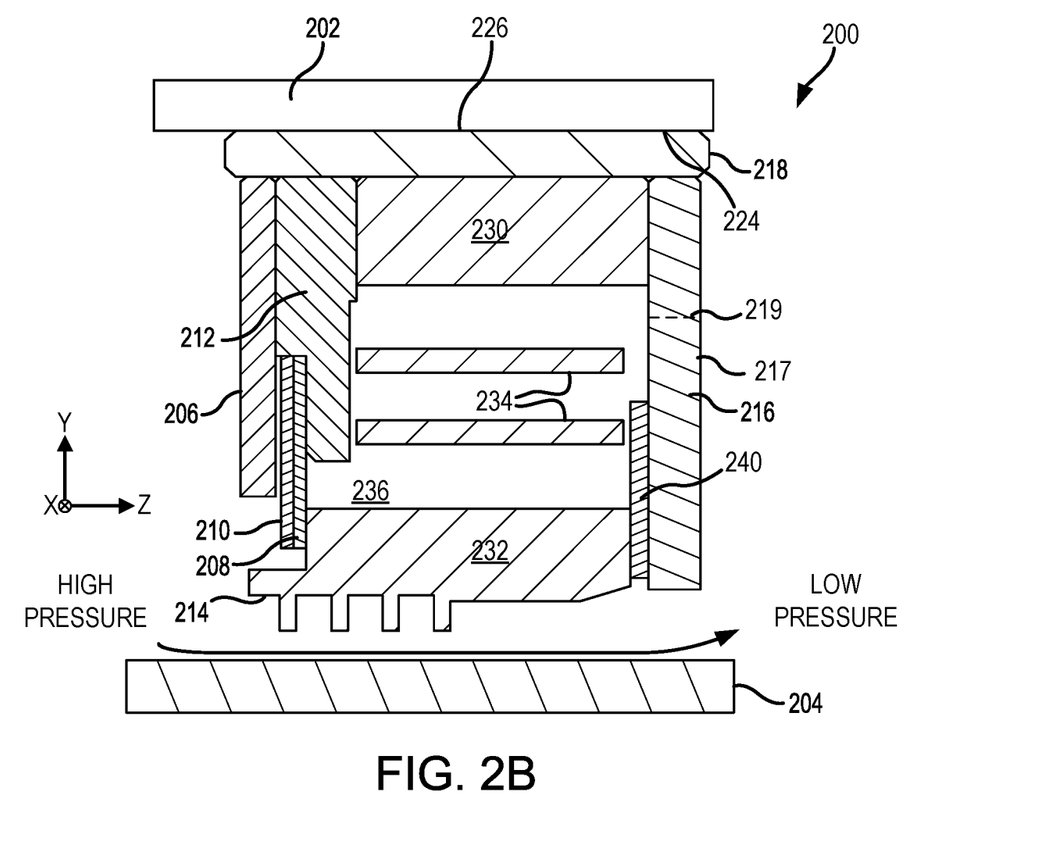
FIG. 2B illustrates the seal arrangement of FIG. 2A in a second position, in accordance with various embodiments.

With reference to FIG. 2A, a fluid, such as air for example, may travel from the high pressure side of seal arrangement 200 to the low pressure side of seal arrangement 200. First secondary seal 208 and second secondary seal 210 may prevent fluid from high pressure side of seal arrangement 200 from entering gap 236 of seal 214. In various embodiments, seal ring 216 may comprise a scalloped ring 217. In this regard, seal ring 216 may comprise a plurality of scalloped openings 219 which allow fluid from low pressure side of seal arrangement 200 into gap 236 of seal 214. As described in further detail in FIG. 4, seal 214 may comprise a shoe 232 attached to outer ring 230 via arms 234. In this regard, it should be appreciated that the pressure gradient across seal 214 may act to move shoe 232 in the radial direction (Y-direction) with respect to outer ring 230. Said movement may aid in preventing shoe 232 from contacting shaft 204. In the illustrated embodiments, FIG. 2A illustrates seal 214 in a first position and FIG. 2B illustrates seal 214 in a second position, wherein with the shoe 232 of seal 214 is moved closer to outer ring 230 in the second position than in the first position.

In various embodiments, seal arrangement 200 may further include a support plate 240 coupled to shoe 232. Support plate 240 may be disposed between shoe 232 and seal ring 216. Support plate 240 and shoe 232 may move together in the radial direction with respect to seal ring 216 in response to the varying pressure of the fluid moving across seal 241. Support plate 240 may provide additional support area for shoe 232 in contact with seal ring 216 to prevent undesirable movement of shoe 232 such as circumferential twisting (i.e., prevent shoe 232 from rotating about the local circumferential direction—e.g., X-direction in FIG. 2A). Support plate 240 may effectively increase the surface area of shoe 232 in contact with seal ring 216. In this regard, support plate 240 may comprise a first surface 242 which rubs against seal ring 216 in response to radial movement of shoe 232. Stated differently, first surface 242 may slide against seal ring 216. In various embodiments, first surface 242 may be manufactured to have a lower coefficient of friction than shoe 232 to reduce friction between first surface 242 and seal ring 216. In various embodiments, support plate 240 may be made from a material with a lower coefficient of friction than that of seal 214.

In various embodiments, support plate 240 may be coupled to a side surface 233 of shoe 232. Side surface 233 may be an axially-facing surface (i.e., facing in the Z-direction). Support plate 240 may be coupled to shoe 232 at a second surface 244. Second surface 244 may be located opposite support plate 240 from first surface 242. The surface area of first surface 242 may be greater than the surface are of side surface 233. In various embodiments, support plate 240 may extend radially outward (positive Y-direction) from shoe 232.

In various embodiments, first surface 242 may be flush with a side surface 231 of outer ring 230. In this regard, side surface 233 of shoe 232 may be axially spaced from side surface 231 of outer ring 230 by a distance substantially equal to the thickness (in the Z-direction) of support plate 240. In this regard, seal 214 may be manufactured by forming side surface 231 and side surface 233 to be flush and then subsequently removing material from the shoe 232 (and arms 234) until the desired axial dimension is achieved.

Support plate 240 may be made from a metal or metal alloy. Support plate 240 may be made from a plastic material, such as a polyvinyl chloride (PVC) material for example.

Figure 5:
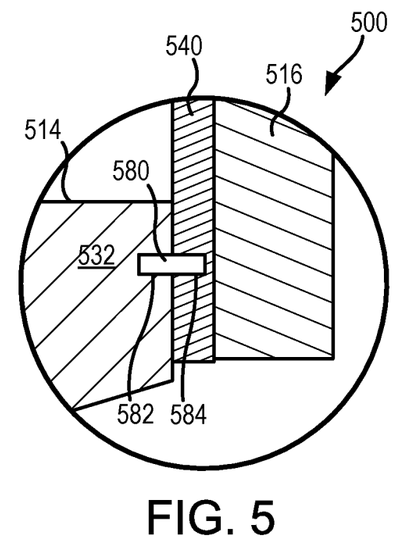
FIG. 5 illustrates a cross-section view of a support plate coupled to a shoe of a seal via a pin, in accordance with various embodiments.

With reference to FIG. 5, a portion of a seal arrangement 500 is illustrated comprising a seal 514 having a shoe 532, a support plate 540, and a seal ring 516, in accordance with various embodiments. Seal arrangement 500 may be similar to seal arrangement 200 of FIG. 2A. Support plate 540 may be coupled to shoe 532 via a pin 580. Shoe 532 may comprise a first aperture 582. Seal ring 516 may comprise a second aperture 584. A first end of pin 580 may be disposed in first aperture 582 and a second end of pin 580 may be disposed in second aperture 584 to prevent movement of support plate 540 with respect to shoe 532. In this regard, first aperture 582 and second aperture 584 are coaxial in the installed position as illustrated in FIG. 5. In various embodiments, pin 580 is pressed into first aperture 582. In various embodiments, pin 580 is pressed into second aperture 584.

Figure 6:
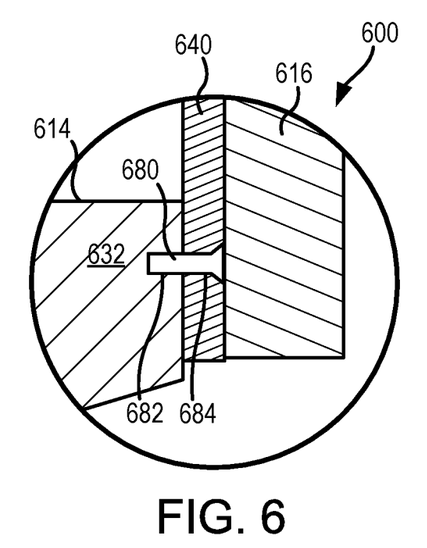
FIG. 6 illustrates a cross-section view of a support plate coupled to a shoe of a seal via a fastener, in accordance with various embodiments.

With reference to FIG. 6, a portion of a seal arrangement 600 is illustrated comprising a seal 614 having a shoe 632, a support plate 640, and a seal ring 616, in accordance with various embodiments. Seal arrangement 600 may be similar to seal arrangement 200 of FIG. 2A. Support plate 640 may be coupled to shoe 632 via a fastener 680, such as a screw, a bolt, or the like. Shoe 632 may comprise a first aperture 682. Seal ring 616 may comprise a second aperture 684. A first end of fastener 680 may be disposed in first aperture 682 and a second end of fastener 680 may be disposed in second aperture 684 to prevent movement of support plate 640 with respect to shoe 632. In this regard, first aperture 682 and second aperture 684 are coaxial in the installed position as illustrated in FIG. 6. In various embodiments, fastener 680 is countersunk into support plate 640.

Figure 7:
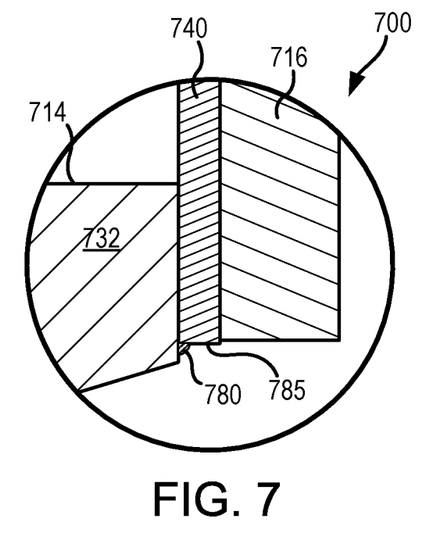
FIG. 7 illustrates a cross-section view of a support plate coupled to a shoe of a seal via a weld material, in accordance with various embodiments.

With reference to FIG. 7, a portion of a seal arrangement 700 is illustrated comprising a seal 714 having a shoe 732, a support plate 740, and a seal ring 716, in accordance with various embodiments. Seal arrangement 700 may be similar to seal arrangement 200 of FIG. 2A. Support plate 740 may be coupled to shoe 732 via a weld material 780. In various embodiments, weld material 780 may be disposed at a radially inner surface 785 of support plate 740. In this regard, support plate 740 may be coupled to shoe 732 via a welding process, a soldering process, a brazing process, or the like.

Figure 8:
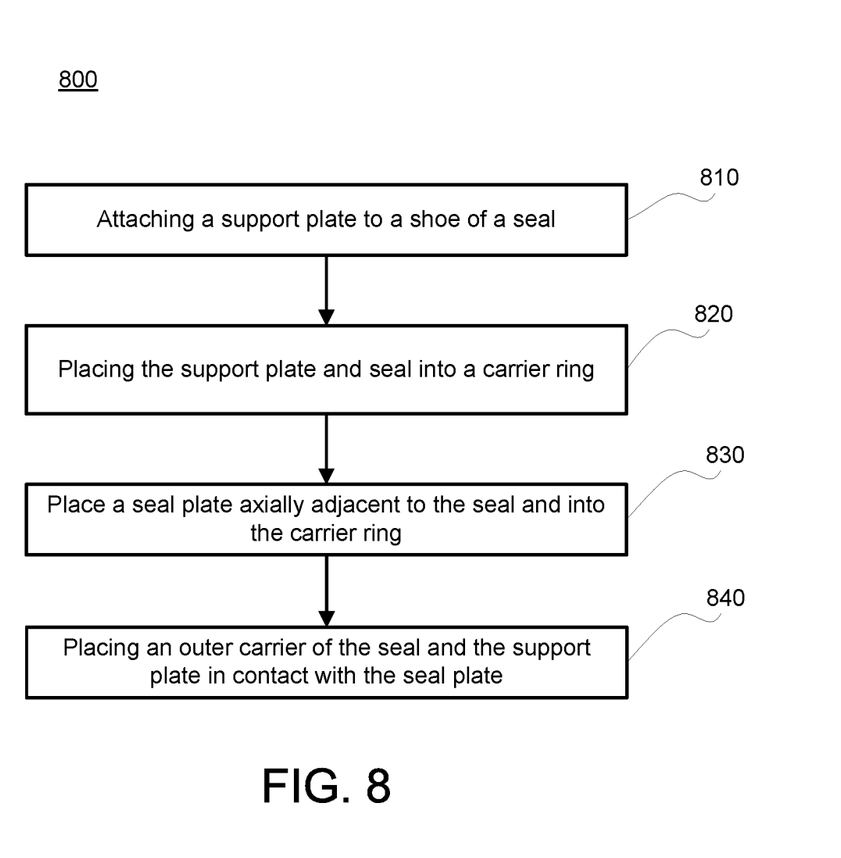
FIG. 8 illustrates a method for assembling a seal arrangement, in accordance with various embodiments.

With reference to FIG. 8, a method 800 for assembling a seal arrangement is provided, in accordance with various embodiments. Method 800 includes attaching a support plate to a shoe of a seal (step 810). Method 800 includes placing the seal and the attached support plate into a carrier ring (step 820). Method 800 includes placing a seal ring axially adjacent to the seal and into the carrier ring (step 830). Method 800 includes placing an outer ring of the seal and the support plate in contact with the seal ring (step 840).

With combined reference to FIG. 2A and FIG. 8, step 810 may include attaching support plate 240 to shoe 232. Step 820 may include placing seal 214 and the attached support plate 240 into carrier ring 218. Seal 214 and the attached support plate 240 may be moved axially with respect to carrier ring 218 during step 820. Step 830 may include placing seal ring 216 into carrier ring 218. Step 840 may include placing outer ring 230 and support plate 240 in contact with seal ring 216. Step 840 may be performed by moving seal ring 216 axially (in the Z-direction) towards seal 214 until seal ring 216 contacts side surface 231 and first surface 242.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal arrangement comprising:
a seal comprising an outer ring, a shoe, and an arm extending between the shoe and the outer ring, wherein the shoe moves relative to the outer ring via the arm;
a seal ring adjacent the seal; and
a support plate coupled to the shoe and disposed between the seal and the seal ring, wherein the support plate is configured to move together with the shoe in a radial direction relative to the seal ring.

2. The seal arrangement of claim 1, wherein the seal, the seal ring, and the support plate are coaxial.

3. The seal arrangement of claim 2, wherein the outer ring is in contact with the seal ring, the arm is spaced apart from the seal ring, and the shoe is spaced apart from the seal ring.

4. The seal arrangement of claim 3, further comprising a fastener coupled between the shoe and the support plate, the fastener configured to prevent the support plate from moving relative to the shoe.

5. The seal arrangement of claim 3, further comprising a pin coupled between the shoe and the support plate, the pin configured to prevent the support plate from moving relative to the shoe.

6. The seal arrangement of claim 3, wherein the shoe is coupled to the support plate via at least one of a weld, a solder, or a braze.

7. The seal arrangement of claim 2, wherein the seal comprises an annular geometry, the seal ring comprises an annular geometry, and the support plate comprises an annular geometry.

8. The seal arrangement of claim 1, further comprising a carrier ring, wherein the seal, the seal ring, and the support plate are disposed within the carrier ring.

9. The seal arrangement of claim 8, further comprising:
a spacer;
at least one secondary seal; and
a secondary seal cover, wherein at least a portion of the at least one secondary seal is located axially between the spacer and the secondary seal cover; and
the spacer, the at least one secondary seal, and the secondary seal cover are located opposite the seal from the seal ring.

10. The seal arrangement of claim 1, wherein the support plate comprises a coefficient of friction which is less than that of the seal.

11. The seal arrangement of claim 1, wherein the seal comprises a non-contact seal.

12. A method for assembling a seal arrangement comprising:
attaching a support plate to a shoe of a seal, the seal comprises an outer ring, the shoe, and an arm extending between the shoe and the outer ring, wherein the shoe and the support plate move together radially relative to the outer ring via the arm; and
placing the seal and the attached support plate into a carrier ring, a distal surface of the outer ring in contact with the carrier ring in response to the seal being placed into the carrier ring.

13. The method of claim 12, further comprising placing a seal ring into the carrier ring.

14. The method of claim 13, wherein the seal ring is placed axially adjacent to the seal.

15. The method of claim 14, further comprising placing the outer ring and the support plate in contact with the seal ring.

16. The method of claim 15, wherein the support plate slides against the seal ring in response to the shoe moving relative to the outer ring.

17. A seal arrangement comprising:
a seal comprising an outer ring, a shoe, and an arm extending between the shoe and the outer ring, wherein the shoe moves relative to the outer ring via the arm;
a seal ring adjacent the seal; and
a support plate coupled to the shoe and disposed between the seal and the seal ring, wherein the support plate moves radially with the shoe relative to the seal ring.

18. The seal arrangement of claim 17, wherein a surface of the support plate is flush with the outer ring.

19. The seal arrangement of claim 18, wherein the surface of the support plate is in contact with the seal ring.

20. The seal arrangement of claim 19, wherein the support plate extends radially outwards from the shoe.

* * * * *